United States Patent
Boss et al.

(10) Patent No.: US 10,891,739 B2
(45) Date of Patent: *Jan. 12, 2021

(54) OBJECT TRACKING WITH A HOLOGRAPHIC PROJECTION

(71) Applicant: International Business Machines Corporation, Armonk, NY (US)

(72) Inventors: Gregory J. Boss, Saginaw, MI (US); John E. Moore, Jr., Brownsburg, IN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,297

(22) Filed: May 23, 2019

(65) Prior Publication Data

US 2019/0279373 A1    Sep. 12, 2019

Related U.S. Application Data

(63) Continuation of application No. 15/180,292, filed on Jun. 13, 2016, now Pat. No. 10,373,319.

(51) Int. Cl.
*G06T 7/246* (2017.01)
*G06T 7/33* (2017.01)
(Continued)

(52) U.S. Cl.
CPC .......... *G06T 7/246* (2017.01); *G06K 9/00671* (2013.01); *G06T 7/33* (2017.01); *H04N 9/3185* (2013.01); *H04N 9/3194* (2013.01)

(58) Field of Classification Search
CPC ....... G06K 9/00671; G06T 7/246; G06T 7/33; H04N 9/3185; H04N 9/3194
See application file for complete search history.

(56) References Cited

U.S. PATENT DOCUMENTS

| 6,031,519 A | 2/2000 | O'Brien |
| 7,995,862 B2 | 8/2011 | Tao et al. |

(Continued)

OTHER PUBLICATIONS

"Creating high-resolution full-color moving holograms in 3-D", http://phys.org/news/2015-02-high-resolution-full-color-holograms-d.html, Feb. 4, 2015, 3 pages.

(Continued)

*Primary Examiner* — Stacy Khoo
(74) *Attorney, Agent, or Firm* — James Nock; Madeline F. Schiesser; Keohane & D'Alessandro, PLLC

(57) ABSTRACT

Approaches presented herein enable tracking a physical object with a holographic projection, and, more specifically, enhancing a view of an object by tracking the object with a 3-D holographic projection. A holographic object tracking projection system receives, from a sensor, a feed of an area containing a physical object and locates a position of the physical object in the area based on the feed. The system creates a visible holographic object to mark the physical object, and projects the holographic object, using a holographic projector, at the position of the physical object. The holographic object can be a shape that surrounds the physical object in order to increase a visibility of the physical object. The physical object may move, and, as the physical object moves, the holographic object tracking projection system tracks this movement and adjusts the holographic object to match the movement of the physical object.

18 Claims, 7 Drawing Sheets

(51) Int. Cl.
    *G06K 9/00*     (2006.01)
    *H04N 9/31*     (2006.01)

(56) References Cited

U.S. PATENT DOCUMENTS

| | | | | |
|---|---|---|---|---|
| 10,373,319 | B2* | 8/2019 | Boss | .................. H04N 9/3185 |
| 2005/0286101 | A1 | 12/2005 | Gamer et al. | |
| 2009/0113348 | A1 | 4/2009 | Fein et al. | |
| 2009/0279154 | A1 | 11/2009 | Lytle, II et al. | |
| 2014/0004485 | A1 | 1/2014 | Younkin et al. | |
| 2014/0071506 | A1 | 3/2014 | Han et al. | |
| 2014/0306953 | A1 | 10/2014 | Morato et al. | |
| 2015/0023557 | A1 | 1/2015 | Yoo et al. | |
| 2015/0121287 | A1 | 4/2015 | Fermon | |
| 2016/0025982 | A1 | 1/2016 | Sutherland et al. | |
| 2016/0267759 | A1 | 9/2016 | Kerzner | |
| 2017/0123490 | A1 | 5/2017 | Westenius et al. | |
| 2017/0307888 | A1 | 10/2017 | Kohler et al. | |
| 2017/0358096 | A1 | 12/2017 | Boss et al. | |

OTHER PUBLICATIONS

EasyMeasure—Measure with your Cameral on the App Store, "iTunes Preview", https://itunes.apple.com/in/app/easymeasure-your-camera!/d3 . . . , Copyright 2016 Apple Inc., 2 pages.

Full Specification, "Samsung's New Patent: Galaxy S7 Will Support the Holographic Display Technology", http://fullspecsblog.blogspot.in/2015/08/samsung-new-patent-galaxy-s7—. . . , Aug. 20, 2015, 5 pages.

Thomas Meeser et al, "Digital holographic recording of large scale objects for metrology and display", 2009, 4 pages.

Patently Apple, "New Technology Emerges to Greatly Advance Pico-Like Projectors & Deliver 3D Holographic Images by Late 2015", http://www.patentapple.com/patently-apple/2014/06/new-technology—. . . , Jun. 8, 2014, 6 pages.

Patently Mobile, "Samsung Invents a Future Smartphone that Could Project Holographic Icons", http://www.patentlymobile.com/2015/08/samsung-invents-a-future-smar . . . , Aug. 11, 2015, 3 pages.

Smart Measure—Android Apps on Google Play, "Smart Measure", https://play.google.com/store/apps/details?id=kr.sira.measure&hl=en, Printed Apr. 15, 2016, 3 pages.

Hisayuki Sasaki et al, OSA Publishing, "Colorization technique for 3D objects enlargement type electronic holography using an optical system and multiple SLMs", https://www.osapublishing.org/abstract.cfm?uri=DH-2013-DTh2A.4, OSA Technical Digest (online) (Optical Society of America, 2013), 3 pages.

Heard, Erin F., U.S. Appl. No. 15/180,292, Office Action, dated Sep. 13, 2018, 26 pgs.

Heard, Erin F., U.S. Appl. No. 15/180,292, Notice of Allowance, dated Mar. 28, 2019, 8 pgs.

Appendix P, "List of IBM Patents or Patent Applications Treated as Related", Mar. 17, 2020, 2 pages.

* cited by examiner

OBJECT TRACKING WITH A HOLOGRAPHIC PROJECTION

RELATED APPLICATION

The present patent document is a continuation of U.S. patent application Ser. No. 15/180,292, filed Jun. 13, 2016, entitled "OBJECT TRACKING WITH A HOLOGRAPHIC PROJECTION", the entire contents of which is incorporated herein by reference.

TECHNICAL FIELD

This invention relates generally to visual image projection and, more specifically, to locating an object with holographic projection.

BACKGROUND

Conventional methods of displaying imagery include projecting an image onto a flat screen, which shows the image in two dimensions (2-D). In recent years, methods of simulating a three-dimensional (3-D) view have been developed. One of these methods includes a user wearing stereoscopic glasses to allow each of the user's eyes to see a different perspective of a representation of an object. In theory, the user's mind combines the images from each eye, creating, to the user, the appearance of 3-D depth. However, the 3-D effect produced by stereoscopic glasses cannot provide accurate depth cues or motion parallax. In other words, it is not possible for a user to move his/her head and observe a representation of an object from different angles.

Holograms, however, can produce more realistic 3-D images. Holograms can allow a user to see different perspectives of a representation of a 3-D object from different angles and locations. Holograms can further provide a user with information about the size, shape, and color of a represented object. These holograms are generally created using lasers, which can produce complex light interference patterns, including spatial data, required to re-create a 3D object.

Several endeavors into the field of holographic imagery have been made, including, for example, the following.

U.S. Pat. No. 7,995,862 discloses: "deriving three-dimensional measurement information and/or creating three-dimensional models and maps, from single images of three-dimensional objects."

U.S. Patent Application Publication 2014/0306953 discloses: generating "a textured model of [an] object" "from received two-dimensional (2D) object information related to [the] object and 3D model representations."

U.S. Patent Application Publication 2015/0023557 discloses: an "object recognition system for recognizing an object" "using a classification tree" that "receive[s], as an input, a depth image representing an object to be analyzed."

SUMMARY

In general, embodiments described herein provide for tracking a physical object with a holographic projection, and, more specifically, enhancing a view of an object by tracking the object with a 3-D holographic projection. A holographic object tracking projection system receives, from a sensor, a feed of an area containing a physical object and locates a position of the physical object in the area based on the feed. The system creates a visible holographic object to mark the physical object, and projects the holographic object, using a holographic projector, at the position of the physical object. The holographic object can be a shape that surrounds the physical object in order to increase a visibility of the physical object. The physical object may move, and, as the physical object moves, the holographic object tracking projection system tracks this movement and adjusts the holographic object to match the movement of the physical object.

One aspect of the present invention includes a method for tracking a physical object with a holographic projection. The method comprises receiving a feed from a sensor of an area containing the physical object and locating a position of the physical object in the area based on the feed from the sensor. The method further comprises creating a visible holographic object to mark the physical object and projecting the visible holographic object into the area at the position of the physical object.

The method can optionally further comprise locating, based on the feed, a second position of the physical object in the area, wherein the physical object moves, and projecting the visible holographic object into the area at the second position of the physical object. This method offers several advantages, such as, but not limited to, moving a holographic object marking a physical object along with the physical object to continuously indicate a position of the physical object.

The method can optionally further comprise receiving a search request from a user, identifying a set of physical objects in the area based on the feed, analyzing the identified set of physical objects for at least one physical object corresponding to the search, and indicating, with the visible holographic object, the at least one physical object corresponding to the search. This method offers several advantages, such as, but not limited to, permitting a user to search for a particular object and indicating the object with a holographic marker for the user.

The visible holographic object can optionally be a 3-dimensional holographic object inclosing the physical object. This offers several advantages, such as, but not limited to, surrounding a physical object with a holographic object, which improves visibility of the physical object.

The method can optionally further comprise locating positions of a plurality of physical objects in the area based on the feed from the sensor and categorizing the plurality of physical objects into a set of categories. This method further comprises determining a distribution of the plurality of physical objects based on the positions. Further, this method comprises projecting, based on the set of categories and the distribution, a set of visible holographic objects into the area, each marking at least one physical object of the plurality of physical objects. This method offers several advantages, such as, but not limited to, highlighting groups of objects with a holographic indicator to increase visibility of a group of objects.

The method can optionally further comprise projecting the visible holographic object from a first holographic projector to a first position of the physical object. This method further comprises detecting a second position of the physical object outside a range of the first holographic projector and projecting the visible holographic object from a second holographic projector to the second position of the physical object. This method offers several advantages, such as, but not limited to, extending a range of holographic projections by allowing a projector to hand off a hologram to another projector.

The method can optionally further comprise detecting a movement of the physical object over a boundary of the area and a final position of the physical object at the boundary. Further, this method comprises creating a visible holographic indicator object to indicate the physical object is outside the boundary and projecting the visible holographic indicator at the final position. This method offers several advantages, such as, but not limited to, permitting a user to see where a physical object may be, even if the physical object is outside of a boundary of a sensor or projector.

Another aspect of the present invention includes a computer system for tracking a physical object with a holographic projection, the computer system comprising: a sensor; a holographic projector; a memory medium comprising program instructions; a bus coupled to the memory medium; and a processor, for executing the program instructions, coupled to a holographic object tracking projection engine via the bus that when executing the program instructions causes the system to: receive a feed from the sensor of an area containing the physical object; locate a position of the physical object in the area based on the feed from the sensor; create a visible holographic object to mark the physical object; and project, by the holographic projector, the visible holographic object into the area at the position of the physical object.

Yet another aspect of the present invention includes a computer program product for tracking a physical object with a holographic projection, the computer program product comprising a computer readable storage device, and program instructions stored on the computer readable storage device, to: receive a feed from a sensor of an area containing the physical object; locate a position of the physical object in the area based on the feed from the sensor; create a visible holographic object to mark the physical object; and project the visible holographic object into the area at the position of the physical object.

Yet still another aspect of the present invention includes a method for tracking a physical object with a holographic projection, comprising: providing a computer infrastructure that includes at least one computer device. The computer device operates to perform the steps of: receiving a feed from a sensor of an area containing the physical object; locating a position of the physical object in the area based on the feed from the sensor; creating a visible holographic object to mark the physical object; and projecting the visible holographic object into the area at the position of the physical object.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
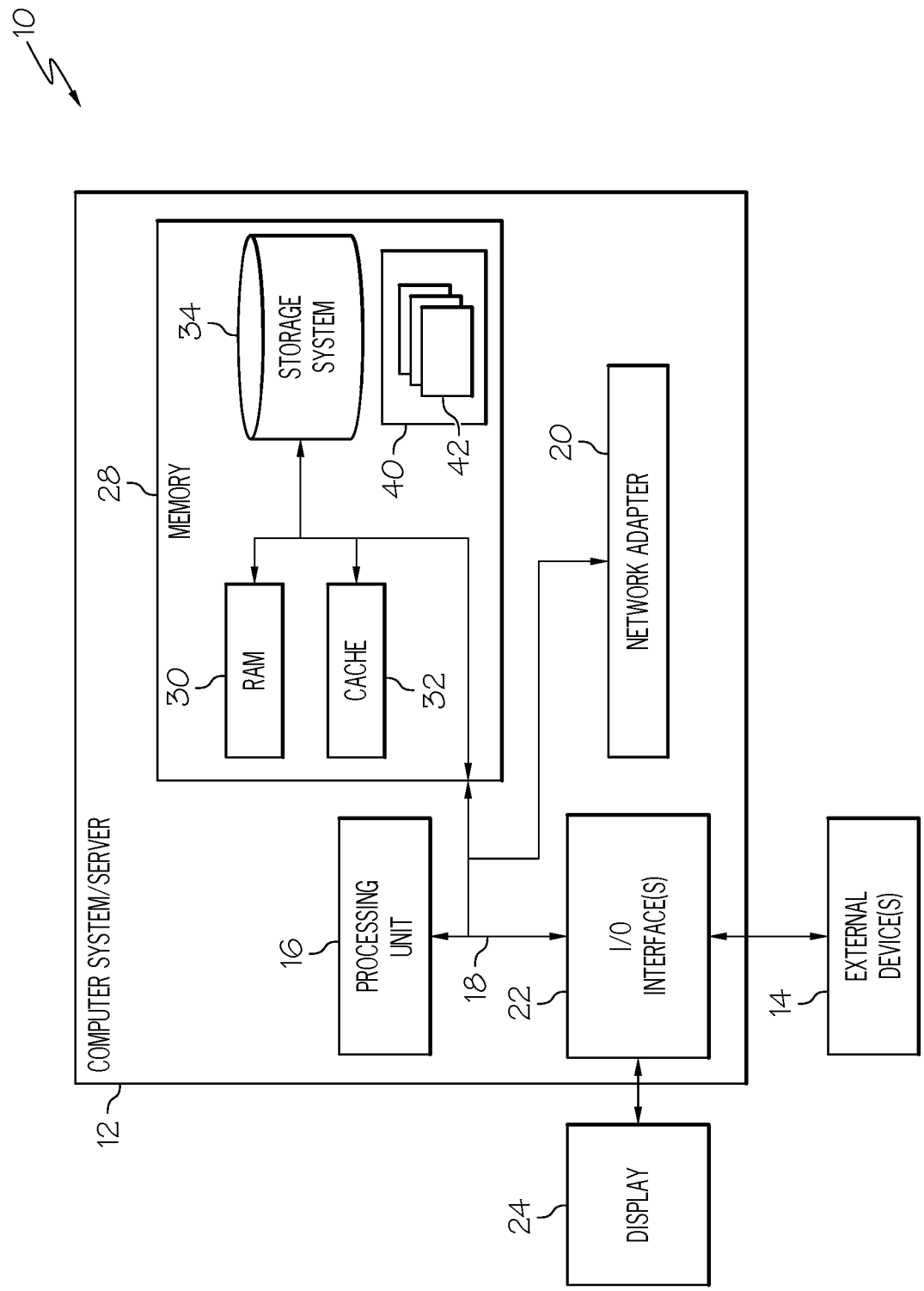
FIG. 1 shows an architecture in which the invention can be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for tracking a physical object with a holographic projection, and, more specifically, enhancing a view of an object by tracking the object with a 3-D holographic projection. A holographic object tracking projection system receives, from a sensor, a feed of an area containing a physical object and locates a position of the physical object in the area based on the feed. The system creates a visible holographic object to mark the physical object, and projects the holographic object, using a holographic projector, at the position of the physical object. The holographic object can be a shape that surrounds the physical object in order to increase a visibility of the physical object. The physical object may move, and, as the physical object moves, the holographic object tracking projection system tracks this movement and adjusts the holographic object to match the movement of the physical object.

Referring now to FIG. 1, a computerized implementation 10 of an embodiment for enhancing a view of an object by tracking the object with a 3-D holographic projection will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can include addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for enhancing a view of an object by tracking the object with a 3-D holographic projection. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for enhancing a view of an object by tracking the object with a 3-D holographic projection, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
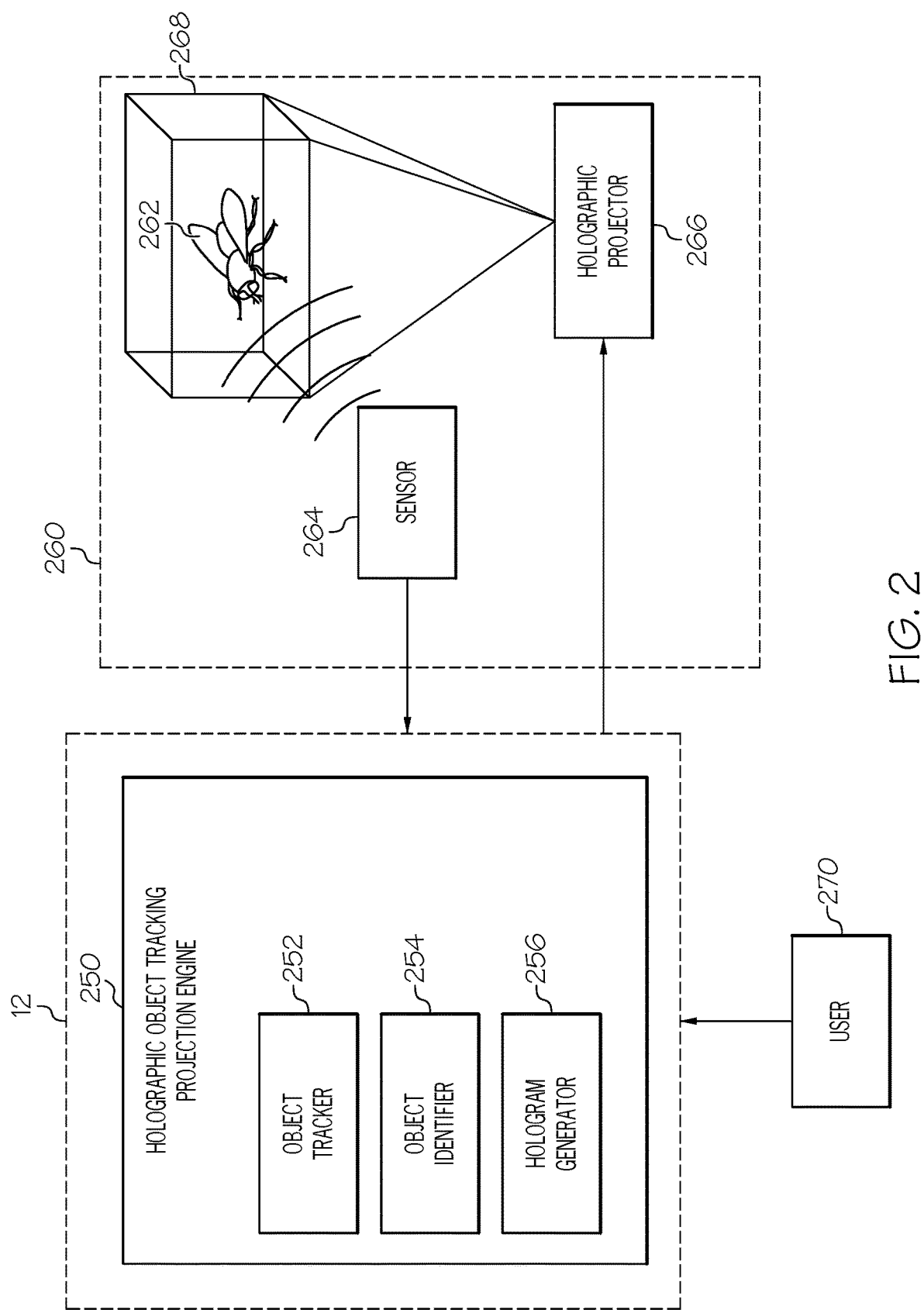
FIG. 2 shows a more detailed system architecture enhancing a view of an object by tracking the object with a 3-D holographic projection according to illustrative embodiments.

Referring now to FIG. 2, a system diagram describing the functionality discussed herein according to an embodiment of the present invention is shown. It is understood that the teachings recited herein may be practiced within any type of computer system/server 12. In general, engine 250 can be implemented as program/utility 40 on computer system 12 of FIG. 1 and can enable the functions recited herein. It is further understood that engine 250 may be incorporated within or work in conjunction with any type of system that receives, processes, and/or executes commands with respect to IT resources in a networked computing environment. Such other system(s) have not been shown in FIG. 2 for brevity purposes.

Along these lines, engine 250 may perform multiple functions similar to a general-purpose computer. Specifically, among other functions, engine 250 can track a physical object with a 3-D holographic object projection. To accomplish this, engine 250 can include: an object tracker 252, an object identifier 254, and a 3-D hologram generator 256.

The inventors of the present invention have discovered several restrictions of current methods of object tracking. More specifically, small objects, and particularly, small fast-moving flying/floating objects, are difficult for a person to find and see. It is often challenging to view and track small fast-moving objects due to their size, random flight paths, and/or speed. Accordingly, a method of enhancing visibility of small fast-moving flying/floating objects is needed.

The inventors of the present invention have further discovered several restrictions of current methods of holographic projection. While some groups are currently developing mobile devices to project digital 3D holographic objects in air, these projections do not respond to or track with physical objects in the projection space.

The approaches described herein contain numerous advantages over present methods. For example, the present invention includes methods of detecting, identifying, tracking, and highlighting objects, including small, fast-moving, floating/flying objects for increased visibility by a user. More specifically, the present inventors have discovered a method of highlighting small, fast-moving, floating/flying objects using a 3-D holographic projection that marks and tracks with a real, physical object. This offers an advantage of permitting a user to better see and visually follow a physical object. Additionally, the present inventors have discovered a method of searching for an object, based on a description, and highlighting the sought object with a 3-D holographic projection. This offers an advantage of permitting a user to enter a search description for a sought object and find the sought object by viewing a holographic marker indicating the object.

Referring again to FIG. 2, sensor 264 detects physical object 262 in space/area 260. Physical object 262 can be a moving object, such as a flying or floating object (e.g., an insect), or a stationary object (e.g., a bolt in a pile of screws and bolts). In some embodiments, sensor 264 can be a camera (e.g., a camera that can measure distance) generating a live feed of space 260 and physical object 262 therein. In other embodiments, sensor 264 can be a motion sensor, or similar sensor, such as, but not limited to, a passive infrared (PIR) sensor, a microwave (MW) sensor, an ultrasound sensor, a duel technology sensor, an area reflective type sensor, an ultrasonic sensor, a vibration sensor and/or any other solution for detecting a physical object 262 in a space/area 260. In any case, sensor 264 can be configured to generate a live or real-time feed of space 260 and physical object 262 therein. In some embodiments, sensor 264 can be a stationary sensor or portable, such as part of a watch or mobile device. Information collected by sensor 264 can include, but is not limited to, a distance of physical object 262 from sensor 264, a location of physical object 262 in space 260, a speed/velocity of physical object 262, a direction of physical object 262, a size of physical object 262, and/or identifying features of physical object 262, such as a color pattern or other markings. In some embodiments, sensor 264 can be a group of sensors, and can be configured to triangulate information about one or more of: a location, a speed, a direction, and a size or other identifying feature, of physical object 262.

In any case, sensor 264 transmits a feed of space/area 260 with gathered information about physical object 262 to holographic object tracking projection (HOTP) engine 250. At HOTP engine 250, object tracker 252 processes the feed of space 260. This processing locates physical object 262 in the feed and determines from the feed a location of physical object 262 in space 260. Further, the processing can include determining a distance from physical object 262 to sensor 264 (e.g., via a distance-measuring camera), as well as a shape and dimensions of physical object 262. Object tracker 252 can further determine a trajectory of physical object 262 in space 260.

3-D hologram generator 256 of HOTP engine 250 creates instructions for a 3-D holographic object/diagram 268 to be projected in the air around physical object 262. Midair holographic object projection is generally known in the art, and will not be described in detail here. 3-D holographic object 268 can be, but is not limited to, a 3-D geometric shape (e.g., a cube or sphere), an indicator (e.g., an arrow), a highlighter (e.g., a holographic outline of the physical object around the physical object), an object related to physical object 262 (e.g., a beehive hologram around a set of physical bees), etc. 3-D holographic object 268 can further, in some embodiments, be a particular color, or set of colors (e.g., red to indicate a dangerous object, or green to indicate a safe object). In further embodiments, holographic object 268 can vary in size, for example closely surrounding object 262 or being several times larger than object 262 to increase visibility. In some embodiments, the generated instructions can be based on, for example, a size, shape, or dimension of physical object 262 (e.g., holographic object 268 can be configured to encase physical object 262); a color selected by a user or determined by HOTP engine 250 (e.g., to contrast for better visibility with a color of physical object 262 or the surrounding area); or a location of physical object 262 relative to sensor 264 or a holographic projector.

HOTP engine 250 transmits the instructions to holographic projector 266, which projects 3-D holographic object 268 according to the instructions. In some embodiments, holographic projector 266 can be a laser or light source that projects 3-D holographic object 268 around physical object 262 in space 260. For example, holographic projector 266 can be, in one embodiment, a holographic pico projector. In other embodiments, holographic projector 266 can be a group of holographic projectors. In some embodiments, the group of holographic projectors can be part of a peer-to peer-communication network and can transfer or hand off the 3-D holographic object 268 to one another to facilitate moving 3-D holographic object 268 with physical object 262.

Figure 3:
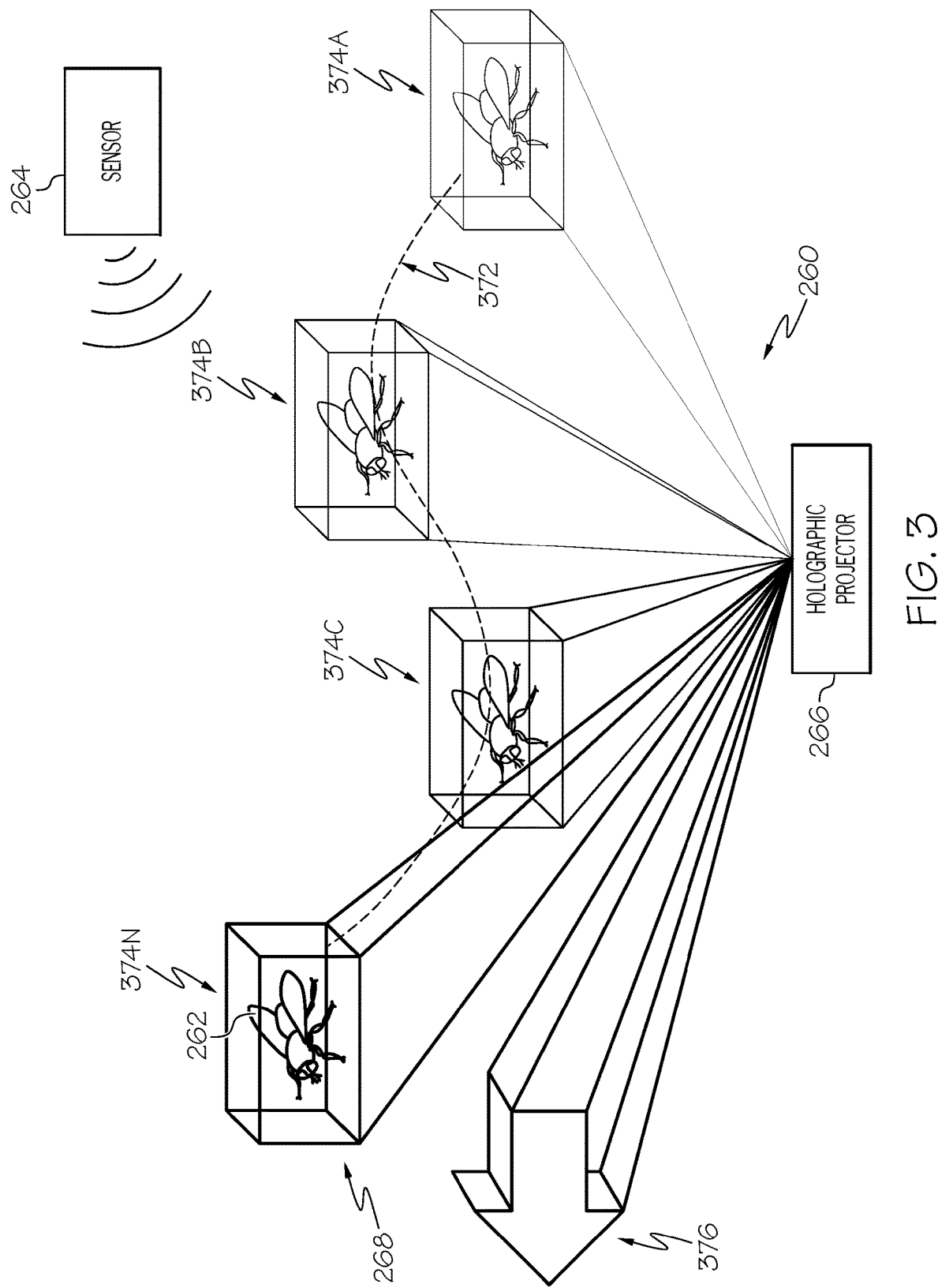
FIG. 3 shows an implementation of an object tracking process using a 3-D holographic projection according to illustrative embodiments.

Referring now to FIG. 3 in conjunction with FIG. 2, in some embodiments, physical object 262 may move. As physical object 262 moves, sensor 264 sends continuing feedback to HOTP engine 250 to adjust the position of 3-D holographic object 268 so that 3-D holographic object 268 tracks with and remains around physical object 262. At the same time, sensor or camera 264 can continue to detect physical object 262 and object tracker 252 can determine whether any changes to (e.g., the trajectory, speed, and/or orientation of) physical object 262 have occurred. For example, physical object 262 may move along trajectory 372, shown in FIG. 3, along which physical object 262 may, at a set of times, be at positions 374A, 374B, 374C, and 374N. Sensor or camera 264 can detect (e.g., by gathering camera images or sensor readings for analysis) a new position 374N of physical object 262. Further, sensor or camera 264 can detect whether physical object 262 has assumed a different orientation (e.g., has rotated or turned such that a different aspect of physical object 262 has presented itself to sensor or camera 264).

In such cases, sensor or camera 264 can transmit information about the new position and/or orientation to object tracker 252 in HOTP engine 250. At HOTP engine 250, 3-D hologram generator 256 can transmit instructions to holographic projector 266 for moving the 3-D hologram to position 274N based on the updated information from object tracker 252. For example, 3-D holographic projector 266 may move 3-D holographic object 268 along trajectory 372 of physical object 262 and may adjust 3-D holographic object 268 to match the new orientation of physical object 262. When physical object 262 is at positions 374A, 374B, 374C, or 374N, holographic projector 266 projects 3-D holographic object 268 to positions 374A, 374B, 374C, or 374N, respectively, to track 3-D holographic object 268 with physical object 262.

Still referring to FIG. 3 in conjunction with FIG. 2, physical object 262 may move outside of space 260 covered by sensor 264 and/or holographic projector 266. In this case, in some embodiments, HOTP engine 250 can direct holographic projector 266 to project a direction indication 376 of where physical object 262 may be. For example, if physical object 262 moves out of space 260 heading to the left of sensor 264, holographic projector 266 can project an arrow or beacon 376 pointing to the left. In some embodiments, user 270 may adjust a location or a facing direction of sensor 264 and/or holographic projector 266 (e.g., by moving a portable sensor or projector, for example, included in a mobile device) towards the direction indicated by direction indication 376 to allow HOTP engine 250 to find the new location of physical object 262. In other embodiments, HOTP engine 250, in response to the moving of physical object 262 out of the field of view of sensor 264, can automatically adjust a location or a facing direction of sensor 264 and/or holographic projector 266 (e.g., by sending a signal to the sensor or projector to turn, rotate, etc.) towards the direction indicated by direction indication 376 to allow HOTP engine 250 to find the new location of physical object 262. In still other embodiments, physical object 262 may move outside of a field of view of user 270. In this case, in some embodiments, HOTP engine 250 can plot visual directions (e.g., a series of arrows) from the user's field of view to a position of physical object 262.

Figure 4:
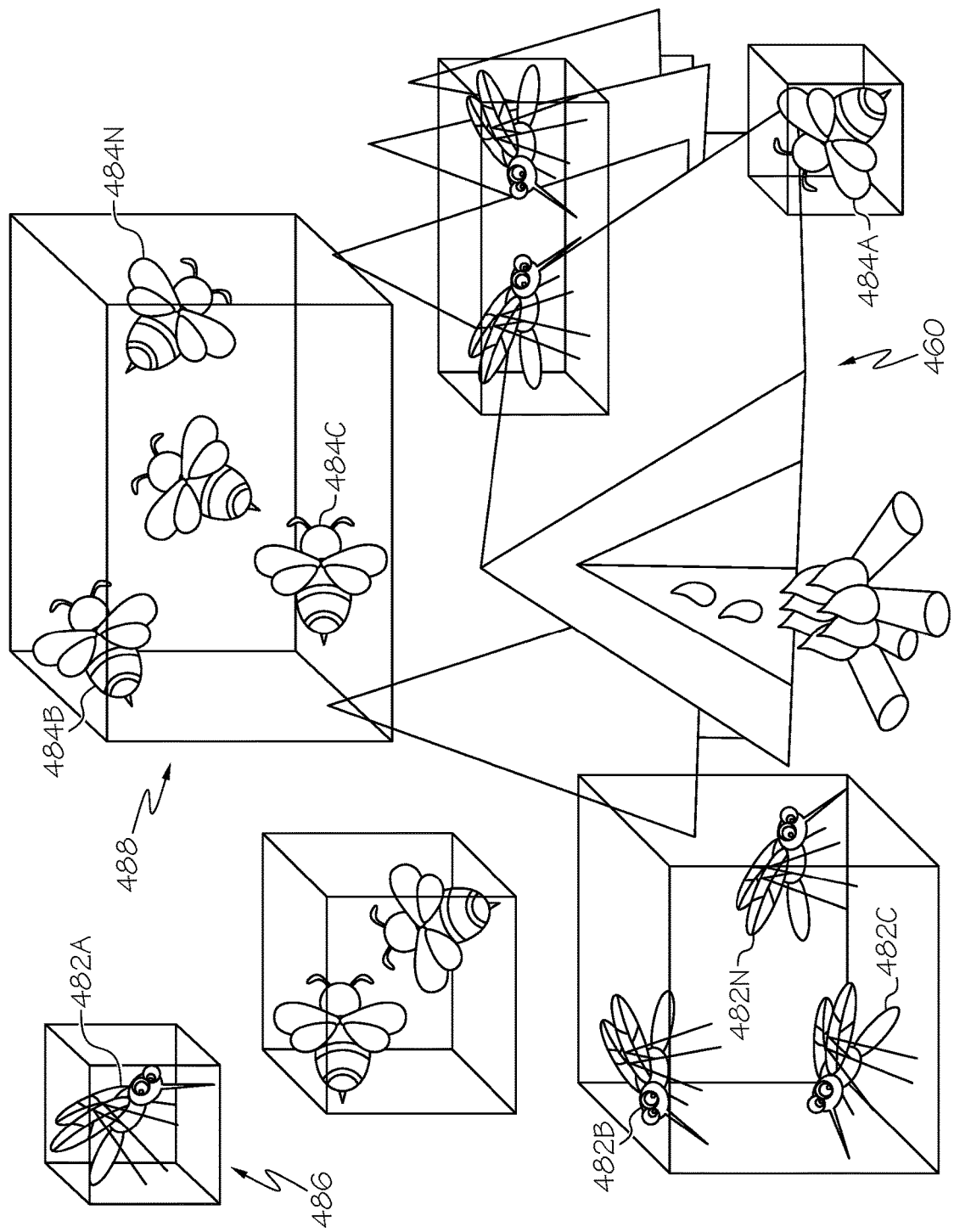
FIG. 4 shows a set of holographic object tracking projections around a set of physical objects according to illustrative embodiments.

Referring now to FIG. 4 in conjunction with FIG. 2, in some embodiments, 3-D hologram generator 256 can instruct holographic projector 266 to project a 3-D holographic object 268 around a group of physical objects 262 and/or to project several 3-D holographic objects 268. In one embodiment, sensor 264 can measure the approximate relative distance of a set of objects (e.g., set of physical bee objects 484A-N) from one another. Object tracker 252 can calculate a distribution of set of physical objects 484A-N in the environment of location 460 and determine if holographic projector 266 is capable of drawing a hologram object to indicate each object of set of physical objects 484A-N. In one example, object tracker 252 calculates the distribution of set of physical objects 484A-N by determining, from the location of each physical object 484A-N, that there is a high concentration of physical objects 484A-N in front of sensor 264 and a lower concentration of objects 484A-N to the right of sensor 264. If the number of objects exceeds the capabilities of holographic projector 266 or if, as indicated in the distribution, some of the objects are clustered close together, then 3-D hologram generator 256 will identify, based on the distribution, areas within location 460 of high concentrations of objects 484A-N and cluster the objects of set of physical objects 484A-N based on relative distance among the objects. 3-D hologram generator 256 can instruct holographic projector 266 to plot one holographic boundary around each cluster. For example, as shown in FIG. 4, set of physical objects 484B-N are located close to one another, and therefore 3-D hologram generator 256 may encircle set of physical objects 484B-N as a group by one 3-D holographic object 488. Physical object 484A, however, is not close to set of physical objects 484B-N, and therefore 3-D hologram generator 256 may encircle physical object 484A by a separate hologram object. In some embodiments, if the number of objects does not exceed the capabilities of holographic projector 266, then holographic projector 266 can draw a hologram around each object.

3-D hologram generator 256 can base the dimension and size of 3-D holographic object 488 on the number of objects 484B-N in a cluster, the shape of the cluster, the movement of objects 484B-N, and a relative threshold distance between or among objects 484B-N. In one embodiment, user 270 may set a maximum threshold distance between objects 484B-N to control and limit what size clusters of objects are shown. In another embodiment, HOTP engine 250 can set the maximum threshold distance between or among objects 484B-N.

In any case, 3-D holographic object 488 can change dynamically in real-time as set of physical objects 484B-N move. 3-D hologram generator 256 can adjust a location, a size, a shape, a color, etc., of hologram object 288 in response to the movements and concentration of set of physical objects 484B-N. Furthermore, 3-D hologram generator 256 can instruct holographic projector 266 to dynamically merge or split holographic object 288 as set of physical objects 484B-N move closer to or further away from, respectively, one another.

Still referring to FIG. 4 in conjunction with FIG. 2, in some embodiments, user 270 may enter search criteria into HOTP engine 250. In response to a user query, object identifier 254 can analyze the feed from sensor 264 to identify objects shown or detected in the feed. Object identifier 254 can be linked to an object information database, knowledge-based system, or other object identification software (not shown) in order to determine an identity of objects shown/detected in the feed by comparing the objects to entries in the database, knowledge-based system, or identification software. For example, in the case that sensor 264 is a camera, object identifier 254 can directly compare an appearance of an object in the feed to entries in the database, knowledge-based system, or identification software to determine the identity of the object. In another example, in the case that sensor 264 is a motion sensor (e.g., an infrared sensor, an ultrasound sensor), object identifier 254 can use gathered information parameters from sensor 264, such as size, dimensions, shape, or weight of an object, to find an object identity matching those parameters in the database, knowledge-based system, or identification software. After object identifier 254 identifies one or more objects in the feed, object identifier 254 can compare identified objects to the user query and determine if any of the identified objects match the query. Once one or more objects matching the user query are found, object identifier 254 can transfer location and identifying information to 3-D hologram generator 256 to create a 3-D holographic object 268 around the sought object.

For example, a user may search for "mosquitoes" at location 460 (e.g., a campground). Object identifier 254 will identify a set of mosquito objects 482A-N and a set of bee objects 484A-N using, for example, object recognition or image analysis technology. Object identifier 254 can categorize each object of set of mosquito objects 482A-N and set of bee objects 484A-N into a category (e.g., "Bees" and "Mosquitoes"). Object identifier 254 can then compare the search query "mosquitoes" with the sets of identified objects, for example based on the categories, and determine that identified set of mosquito objects 482A-N match the query. 3-D hologram generator 256 can then transmit instructions to holographic projector 266 to project 3-D holographic object 486 around one or more subsets of set of mosquito objects 482A-N.

Still referring to FIG. 4 in conjunction with FIG. 2, in further embodiments, user 270 may enter multiple queries and direct how the objects found by the query should be indicated. In some embodiments, a user interface containing a search field can be provided to user 270 on computer system 12, a user device, or any device in contact with computer system 12. This search feature can contain, for example, natural language processing, a keyword database, and/or an object identification database, etc. In an illustrative example, user 270 may enter "find bees and mosquitoes" into a search filed on a user interface of computer device 12 and direct that bees should be indicated in yellow and mosquitoes should be indicated in red. In response, HOTP engine 250 will process the request to determine a meaning of "bees" and "mosquitoes", identify set of bee objects 484A-N and set of mosquito objects 482A-N based on information about "bees" and "mosquitoes" in, for example, an object identification database, and instruct holographic projector 266 to project a yellow 3-D holographic object 488 around one or more subsets of set of bee objects 484A-N and a red 3-D holographic object 486 around one or more subsets of set of mosquito objects 482A-N. In some other embodiments, HOTP engine 250 can select indicators for each type of different object, such as, but not limited to, color and shape indicators.

Figure 5:
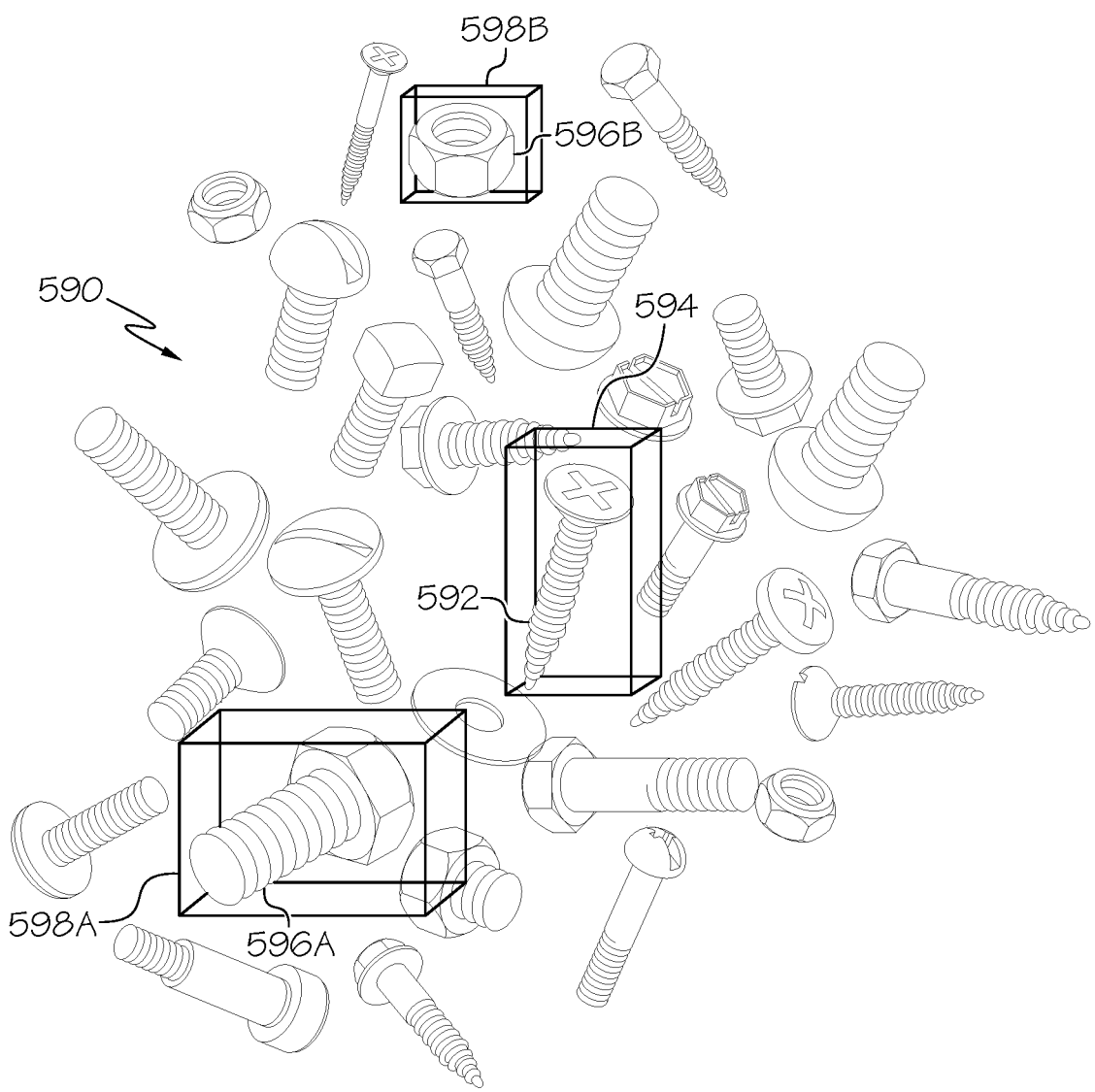
FIG. 5 shows a set of holographic objects for indicating searched for and related physical objects according to illustrative embodiments.

Referring now to FIG. 5 in conjunction with FIG. 2, in some further embodiments, user 270 may search for a physical object 592 among a group (e.g., of hundreds, thousands) of mixed physical objects 590 (e.g., screws, bolts, and nuts) using a defined search criteria. For example, if user 270 wants to find a physical object 592 (e.g., a screw) with a specified dimension, user 270 may enter the dimensions of the sought physical object into a search provided by HOTP engine 250. In some embodiments, user 270 may also search by color, size, weight, etc. Object identifier 254 can then identify with image analysis any physical object 592 in group of objects 590 that correspond to the search criteria. 3-D hologram generator 256 can then instruct holographic projector 266 to project 3-D holographic object 594 around one or more of sought object(s) 292 to make the object(s) 292 more easy for the user to identify.

Still referring to FIG. 5 in conjunction with FIG. 2, in some embodiments, HOTP engine 250 can be used to highlight contextually related objects. User 270 may search for an object 596A and complimentary/matching object 596B (e.g., a bolt and matched nut from a collection). For example, user 270 may enter a description of object 596A (e.g., a screw) into a search provided by HOTP engine 250 and request that HOTP engine 250 find object 596A and a matching object 596B (e.g., a matching nut). In another example, user 270 may request that HOTP engine 250 find a matched set of a particular kind of object (e.g., any bolt with any matching nut). In any case, object identifier 254 can identify complimentary objects 596A and 596B and 3-D hologram generator 256 can instruct holographic projector 266 to project holographic objects 598A and 598B around objects 296A and 296B, respectively. In some embodiments, holographic objects 598A and 598B can be different colors or include some other distinguishing indicator.

Figure 6:
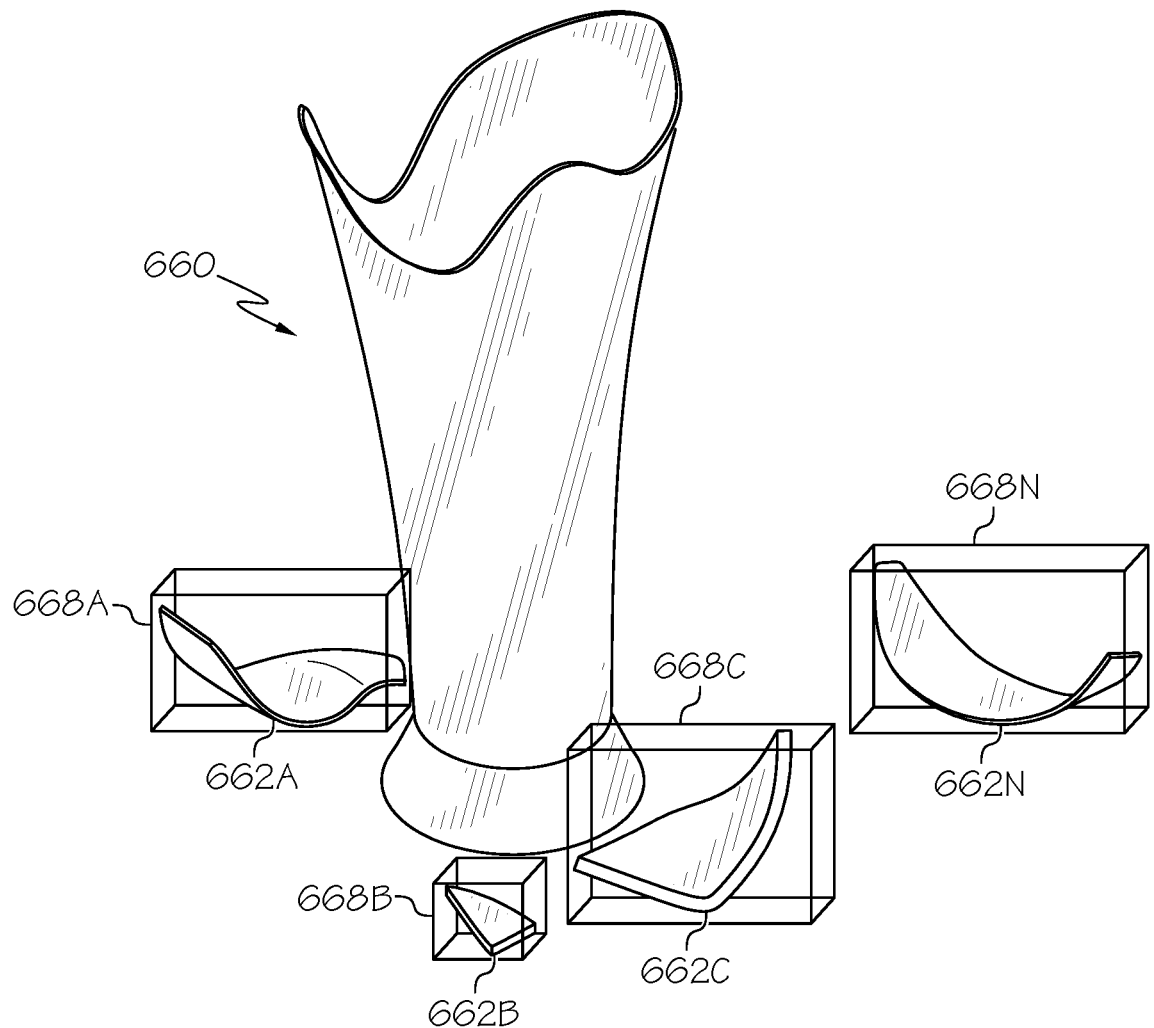
FIG. 6 shows a set of holographic objects for indicating difficult to see physical objects according to illustrative embodiments.

Referring now to FIG. 6 in conjunction with FIG. 2, in some embodiments, HOTP engine 250 can find and highlight a plurality of hard-to-see objects 662A-N in order to increase visibility to a user. This may be, for example, in response to a user prompt or to a detection of an area containing a plurality of small, hard-to-see, and/or fast-moving objects. For example, if user 270 breaks drinking glass 660, object tracker 252 can search for broken glass pieces 662A-N identified by object identifier 254. 3-D hologram generator 256 can then instruct holographic projector 266 to project holographic objects 668A-N around broken glass pieces 662A-N, respectively. Projected holographic objects 668A-N increase the visibility of otherwise hard to see broken glass pieces 662A-D, permitting user 270 to find each piece without injury.

Figure 7:
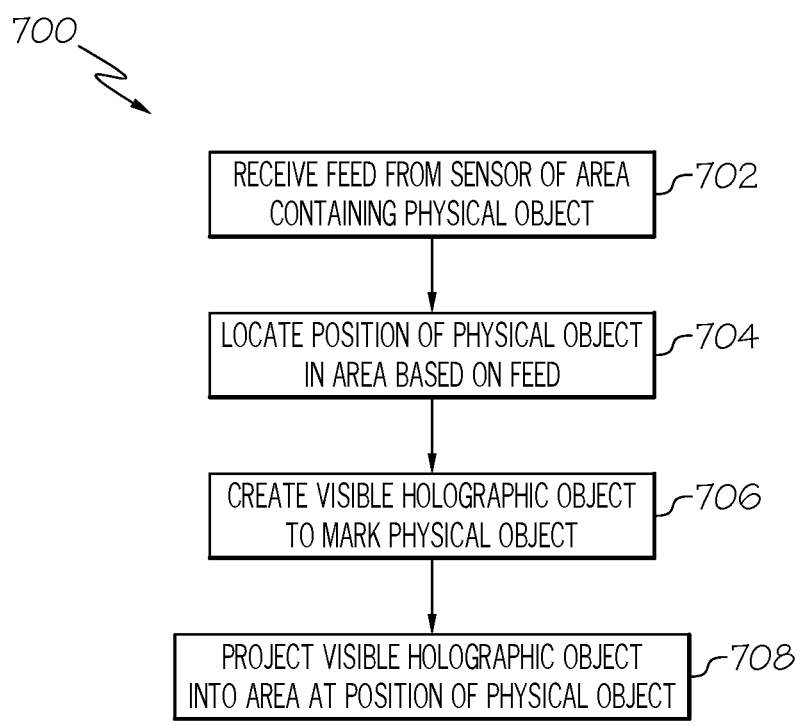
FIG. 7 shows a process flowchart for enhancing a view of an object by tracking the object with a 3-D holographic projection according to illustrative embodiments.

As depicted in FIG. 7, in one embodiment, a system (e.g., computer system 12) carries out the methodologies disclosed herein. Shown is a process flowchart 700 for tracking a physical object with a holographic projection. At process 702, a feed is received from a sensor of an area containing a physical object. At process 704, a position of the physical object is located in the area based on the feed from the sensor. At process 706, a visible holographic object is created to mark the physical object. At process 708, the visible holographic object is projected into the area at the position of the physical object.

Process flowchart 700 of FIG. 7 illustrates the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit including custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, include one or more physical or logical blocks of computer instructions, which may, for instance, be organized as an object, procedure, or function. Nevertheless, the executables of an identified system or unit need not be physically located together, but may include disparate instructions stored in different locations which, when joined logically together, include the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for enhancing a view of an object by tracking the object with a 3-D holographic projection. Thus, embodiments herein disclose a process for supporting computer infrastructure, including integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for enhancing a view of an object by tracking the object with a 3-D holographic projection. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands including words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to project holographic object trackers. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method of tracking a physical object with a holographic projection, comprising:
   obtaining a feed from a sensor of an area containing at least one physical object;
   locating positions of a set of physical objects in the area based on the feed from the sensor;
   categorizing the set of physical objects into a set of categories;
   determining a distribution of the set of physical objects based on the positions;
   creating a set of visible holographic objects to mark the set of physical objects; and
   projecting, based on the set of categories and the distribution, the set of visible holographic objects into the area at the positions of the set of physical objects, each visible holographic object marking at least one physical object of the set of physical objects.

2. The method of claim 1, the method further comprising:
   locating, based on the feed, a second position of at least one physical object of the set of physical objects in the area, wherein the at least one physical object moves; and
   projecting a visible holographic object of the set of visible holographic objects into the area at the second position of the at least one physical object.

3. The method of claim 1, the method further comprising:
   obtaining a search request from a user;
   analyzing the categorized set of physical objects for at least one physical object corresponding to the search; and
   indicating, with a visible holographic object, the at least one physical object corresponding to the search.

4. The method of claim 1, wherein the set of visible holographic objects include at least one 3 dimensional holographic object inclosing at least one physical object of the set of physical objects.

5. The method of claim 1, the method further comprising:
   projecting at least one of the visible holographic objects from a first holographic projector to a first position of at least one of the physical objects;
   detecting a second position of the at least one of the physical objects outside a range of the first holographic projector; and
   projecting an indicator of a direction towards the second position of the at least one of the physical objects.

6. The method of claim 1, the method further comprising:
   detecting a movement of at least one of the physical objects over a boundary of the area and a final position of the at least one of the physical objects at the boundary;
   creating a visible holographic indicator object to indicate the at least one of the physical objects is outside the boundary; and
   projecting the created visible holographic indicator at the final position.

7. A computer system for tracking a physical object with a holographic projection, the computer system comprising:
   a sensor;
   a holographic projector;
   a memory medium comprising program instructions;
   a bus coupled to the memory medium; and
   a processor, for executing the program instructions, coupled to a holographic object tracking projection engine via the bus that when executing the program instructions causes the system to:
      obtain a search request from a user;
      obtain a feed from the sensor of an area containing a set of physical objects;
      locate positions of the set of physical objects in the area based on the feed from the sensor;
      identify the set of physical objects in the area based on the feed;
      analyze the identified set of physical objects for at least one physical object corresponding to the search;
      create a visible holographic object to mark the at least one physical object;
      project, by the holographic projector, the visible holographic object into the area at the position of the at least one physical object; and
      indicate, with the visible holographic object, the at least one physical object corresponding to the search.

8. The computer system of claim 7, the instructions further causing the system to:
   locate, based on the feed, a second position of the at least one physical object in the area, wherein the at least one physical object moves; and
   project the visible holographic object into the area at the second position of the at least one physical object.

9. The computer system of claim 7, wherein the visible holographic object is a 3 dimensional holographic object inclosing the at least one physical object.

10. The computer system of claim 7, the instructions further causing the system to:
    locate positions of a plurality of physical objects in the area based on the feed from the sensor;
    categorize the plurality of physical objects into a set of categories;
    determine a distribution of the plurality of physical objects based on the positions; and
    project, based on the set of categories and the distribution, a set of visible holographic objects into the area, each marking at least one physical object of the plurality of physical objects.

11. The computer system of claim 7, the instructions further causing the system to:
    project the visible holographic object from the first holographic projector to a first position of the at least one physical object;
    detect a second position of the at least one physical object outside a range of the first holographic projector; and
    project an indicator of a direction towards the second position of the at least one physical object.

12. The computer system of claim 7, the instructions further causing the system to:
    detect a movement of the at least one physical object over a boundary of the area and a final position of the at least one physical object at the boundary;
    create a visible holographic indicator object to indicate the at least one physical object is outside the boundary; and
    project the visible holographic indicator at the final position.

13. A computer program product for tracking a physical object with a holographic projection, the computer program product comprising a computer readable storage device, and program instructions stored on the computer readable storage device, to:
    obtain a search request from a user;
    obtain a feed from a sensor of an area containing a set of physical objects;
    locate positions of the set of physical objects in the area based on the feed from the sensor;

identify the set of physical objects in the area based on the feed;

analyze the identified set of physical objects for at least one physical object corresponding to the search;

create a visible holographic object to mark the at least one physical object;

project the visible holographic object into the area at the position of the at least one physical object; and indicate, with the visible holographic object, the at least one physical object corresponding to the search.

14. The computer program product of claim 13, the computer readable storage device further comprising instructions to:

locate, based on the feed, a second position of the at least one physical object in the area, wherein the at least one physical object moves; and project the visible holographic object into the area at the second position of the at least one physical object.

15. The computer program product of claim 13, wherein the visible holographic object is a 3 dimensional holographic object inclosing the at least one physical object.

16. The computer program product of claim 13, the computer readable storage device further comprising instructions to:

locate positions of a plurality of physical objects in the area based on the feed from the sensor;

categorize the plurality of physical objects into a set of categories;

determine a distribution of the plurality of physical objects based on the positions; and project, based on the set of categories and the distribution, a set of visible holographic objects into the area, each marking at least one physical object of the plurality of physical objects.

17. The computer program product of claim 13, the computer readable storage device further comprising instructions to:

project the visible holographic object from a first holographic projector to a first position of the at least one physical object;

detect a second position of the at least one physical object outside a range of the first holographic projector; and project an indicator of a direction towards the second position of the at least one physical object.

18. The computer program product of claim 13, the computer readable storage device further comprising instructions to:

detect a movement of the at least one physical object over a boundary of the area and a final position of the at least one physical object at the boundary;

create a visible holographic indicator object to indicate the at least one physical object is outside the boundary; and project the visible holographic indicator at the final position.

\* \* \* \* \*